US008512057B2

(12) United States Patent
Haar et al.

(10) Patent No.: US 8,512,057 B2
(45) Date of Patent: Aug. 20, 2013

(54) DEVICE COMPRISING RIGID CONNECTING BARS FOR THE CONDUCTING CONNECTION OF FIRST TO SECOND BUSBARS

(75) Inventors: Rainer Haar, Bonn (DE); Niels Nielsen, Büdelsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/129,128

(22) PCT Filed: Nov. 4, 2009

(86) PCT No.: PCT/EP2009/064567
§ 371 (c)(1), (2), (4) Date: May 13, 2011

(87) PCT Pub. No.: WO2010/054962
PCT Pub. Date: May 20, 2010

(65) Prior Publication Data

US 2011/0221205 A1 Sep. 15, 2011

(30) Foreign Application Priority Data

Nov. 16, 2008 (DE) ......................... 10 2008 058 129

(51) Int. Cl.
*H01R 4/60* (2006.01)

(52) U.S. Cl.
USPC .......................................................... 439/212

(58) Field of Classification Search
USPC ................ 439/212–213, 78, 427, 733.1, 210, 439/215; 174/70 B, 71 B, 86, 86.2, 88 B
See application file for complete search history.

(56) References Cited

U.S. PATENT DOCUMENTS 3,446,911 A 5/1969 Jorgensen
3,459,874 A 8/1969 Weimer (Continued)

FOREIGN PATENT DOCUMENTS

CA 2087764 A1 8/1993
CA 2458581 A1 3/2003

(Continued)

OTHER PUBLICATIONS

German priority document DE 102008058129, filed Nov. 16, 2008, published May 20, 2010.

(Continued)

*Primary Examiner* — Jean F Duverne
(74) *Attorney, Agent, or Firm* — Harness, Dickey & Pierce, P.L.C.

(57) ABSTRACT

A device includes rigid connecting bars for conductively connecting first to second busbars, the contact sides of which run parallel to each other and which can be held together with the connecting bars by applying pressure with the help of a first and a second connecting mechanism, each of which has a connecting bolt extending transverse to the contact sides. In at least one embodiment, each of the connecting bars has a first contact surface to conductively contact the contact side of one of the first busbars while having a second contact surface to conductively contact the contact side of one of the second busbars. In order to be able to even more easily connect the first and second busbars, especially when the busbars are pre-assembled in segments, e.g. in power module segments of a wind power plant, the connecting bars have a first and a second recess that is open on one side, namely on the side facing the connecting bolts, such that the connecting bars embrace the connecting bolts.

17 Claims, 10 Drawing Sheets

60
65
63
64
61
61
143
85
81
81
140
83
83
84
85
61
81
85
243

(56) References Cited

U.S. PATENT DOCUMENTS

| | | | | |
|---|---|---|---|---|
| 3,519,730 | A | 7/1970 | Fouse | |
| 3,609,215 | A | 9/1971 | Fulop | |
| 4,740,864 | A * | 4/1988 | Stanfield et al. | 361/611 |
| 5,261,830 | A * | 11/1993 | Jego et al. | 439/210 |
| 5,401,906 | A * | 3/1995 | Bryant | 174/88 B |
| 5,785,542 | A * | 7/1998 | Johnson | 439/213 |
| 5,821,464 | A * | 10/1998 | Graham et al. | 174/86 |
| 6,176,720 | B1 | 1/2001 | Johnson | |
| 6,435,888 | B1 | 8/2002 | Reed, Jr. | |
| 6,870,103 | B1 * | 3/2005 | Wiant et al. | 174/68.2 |
| 6,884,953 | B2 * | 4/2005 | Nii et al. | 200/294 |
| 6,888,066 | B1 * | 5/2005 | Wiant et al. | 174/68.2 |
| 7,091,417 | B1 * | 8/2006 | Jur et al. | 174/68.2 |
| 7,115,000 | B1 * | 10/2006 | Huang | 439/801 |
| 7,334,315 | B2 * | 2/2008 | Wiant et al. | 29/592.1 |
| 7,449,635 | B2 * | 11/2008 | Wiant | 174/68.2 |
| 7,718,895 | B2 * | 5/2010 | Rodriguez | 174/84 R |
| 7,759,577 | B1 * | 7/2010 | Morales | 174/68.2 |
| 2004/0131467 | A1 | 7/2004 | Wobben | |
| 2005/0042099 | A1 | 2/2005 | Wobben | |
| 2008/0152496 | A1 | 6/2008 | Wobben | |
| 2010/0019503 | A1 | 1/2010 | Wobben | |

FOREIGN PATENT DOCUMENTS

| | | | |
|---|---|---|---|
| CA | 2463950 | A1 | 5/2003 |
| CN | 2696145 | | 4/2005 |
| DE | 4302783 | A1 | 8/1993 |
| DE | 4225837 | A1 | 2/1994 |
| DE | 19820548 | A1 | 11/1999 |
| DE | 10145414 | A1 | 5/2003 |
| DE | 10152557 | C1 | 6/2003 |

OTHER PUBLICATIONS

Office Action for corresponding Chinese patent application No. 200980145481.2 dated Apr. 15, 2013 with English translation.

* cited by examiner 6
4
7
11
6
10
9
9
1
2
8
12
13
18
14
18
15
18
5
16
19
17
20
3

51
30
31
32
133
61
130
131
132
233
61
230
231
232
334

DEVICE COMPRISING RIGID CONNECTING BARS FOR THE CONDUCTING CONNECTION OF FIRST TO SECOND BUSBARS

PRIORITY STATEMENT

This application is the national phase under 35 U.S.C. §371 of PCT International Application No. PCT/EP2009/064567 which has an International filing date of Nov. 4, 2009, which designates the United States of America, and which claims priority on German patent application number DE 10 2008 058 129.1 filed Nov. 16, 2008, the entire contents of each of which are hereby incorporated herein by reference.

FIELD

At least one embodiment of the invention lies within the field of line distributors and generally relates to the construction of a device comprising rigid connecting bars for conductively connecting first to second busbars, the contact sides of which run parallel to each other and which can be held together with the connecting bars by applying pressure with the aid of a first and a second connecting mechanism, each of which has a connecting bolt extending transverse to the contact sides, wherein each of the connecting bars has a first contact surface to conductively contact the contact side of one of the first busbars while having a second contact surface to conductively contact the contact side of one of the second busbars.

BACKGROUND

A generic device is known from document DE 43 02 783 A1 in which the connecting bars are pushed between first and second busbars to be connected, which busbars oppose each other at their ends, and are then connected by a single connecting bolt to the first and second busbars. In the process the connecting bolt penetrates the connecting bars in the region of a first through-opening. Third busbars are also provided in this known device, which are to be connected to the first and second busbars and have a recess that is open on one side to embrace a second connecting bolt which penetrates the connecting bars in the region of a second through-opening. In the process the third busbars extend parallel to the butt joint which is formed between the end faces of the first and second busbars.

However, in practice busbars are pre-assembled in segments in order to be connected later at the place of use. This is the case, by way of example, in wind turbines or on ships.

Document DE 101 52 557 C1, by way of example, therefore discloses a wind turbine with a tower constructed from a plurality of tower segments, with a generator arranged in the region of the tower head, with a power module arranged in the region of the tower base and with current conduction device(s) for transmitting current from the generator to the power module. The electrical power module in this wind turbine, which includes the electrical units, such as transformer, switch panels, optionally rectifiers, medium voltage electrical installations, low voltage distribution, etc. is arranged below the generator level in the region of the tower base of the wind turbine.

Current conduction device(s), which extend inside the tower, are provided to transmit the electrical energy generated by the generator arranged inside the nacelle in the region of the top of the tower to the power module. These current conduction device(s) include busbars pre-assembled in the individual tower segments and which are connected in the region of the joints of the individual tower segments with the aid of flexible connecting bars. Prefabricated busbar segments are therefore preferably provided on the tower segments before the tower is erected from the individual tower segments, and the busbar segments are connected with the aid of the flexible connecting bars following erection of the tower.

It is no longer necessary to laboriously pull cables through the tower following its erection in order to electrically connect together generator and power module. The total wind turbine erection time can consequently be reduced and the costs of erection lowered without any technical drawbacks having to be accepted. Connection of the flexible connecting bars to the pre-assembled busbar segments is still laborious, however, as the individual phase conductors of the busbars have to be individually connected to associated phase conductors of the flexible connecting bars.

It is also known from document DE 101 45 414 A1 that the power module of a wind turbine is mounted on a tower base before erection of the tower. The illustrated power module is firstly set on a supporting plate. It consists of two power module segments which are placed one above the other and comprises supports which hold essential parts of the power module, i.e. for example the transformer, rectifier, switch panels, medium voltage electrical installation, etc. The supports placed one above the other are constructed in the manner of a frame and fit exactly one above the other, so reliable securing against each other is also ensured. The individual supports comprise struts inter alia that are connected to each other.

Once the electrical power module has been placed on the base the tower is erected and placed over the power module in the process. The external dimensions of the power module in relation to width and length are smaller than the internal diameter of the tower in the bottom region of the tower/base region. Once the tower has been erected the wind turbine is fitted with the nacelle as is customary, the rotor is mounted and appropriate electrical connections are made between the generator and the power module for commissioning and the power module (output of the transformer) is also connected to the power supply system. In practice the individual phase conductors of the power module segments have previously been laboriously connected with the aid of flexible intermediate pieces (cables) which are connected to the phase conductors with the aid of a screw connection.

It is desirable both when assembling the tower segments one above the other and when assembling the power module segments one above the other, but, for example, also when placing ship's containers or mobile homes next to each other for the busbars pre-assembled in the segments or containers to not project beyond the external dimensions of the respective segment/container to prevent damage to the busbars when joining the segments/containers together.

SUMMARY

At least one embodiment of the present application is directed to a device comprising rigid busbars for conductively connecting first and second busbars, wherein the first and second busbars are connected even more simply. In at least one embodiment, they are pre-assembled in segments, for example in power module segments of a wind turbine.

According to at least one embodiment of the invention is directed to a device wherein the connecting bars have a first and a second recess respectively that is open on one side, namely on the side facing the connecting bolts, such that the connecting bars embrace the connecting bolts.

In an embodiment of this kind the connecting bars can firstly be pushed over the connecting bolts with a few simple movements from one side and in the process their contact surfaces are brought into conductive contact with one contact side respectively of one of the first and one of the second busbars and, secondly, by twisting the connecting bolts can then be quickly conductively connected both easily and reliably.

In an example embodiment, it is provided that for conductively connecting the first and second busbars to third busbars, the contact sides of which run parallel to the contact sides of the first and second busbars and which can be held together with the connecting bars by applying pressure with the aid of a third connecting mechanism, which has a connecting bolt extending transverse to the contact sides, each of the connecting bars has a third contact face to conductively contact a contact side of one of the third busbars and has a third recess that is open on one side, namely on the side facing the connecting bolts, such that the connecting bars embrace the connecting bolts.

The connecting bars are preferably planar, so the first, second and third contact faces are located in a common contact plane.

To protect people from contacting the busbars and to protect the busbars from damage wall elements that enclose the conductive connection are provided in a further embodiment and these can be connected to busbar boxes that enclose the busbars to form a busbar box terminal.

The busbars can preferably be connected with the aid of the connecting bars to form an L- or T-shaped busbar terminal section and the busbar boxes can be connected with the aid of the wall elements to form an L- or T-shaped busbar box terminal section.

At least one embodiment of the new device is preferably provided in an arrangement comprising at least one first and one second segment, in particular a first and a second power module segment of the wind turbine, and conductively connects pre-assembled first busbars in the first segment to pre-assembled second busbars in the second segment, wherein the pre-assembled busbars do not project beyond the outer dimensions of the segments and their contact sides run parallel to each other and wherein the first and second busbars are held together with the connecting bars by applying pressure with the aid of two connecting devices, which each have a connecting bolt extending transverse to the contact sides.

At least one embodiment of the inventive device therefore has two connecting points, wherein a first one of the connecting points (connecting bolts) is located inside the first segment and the second and possibly a third is located inside the second segment.

The division into at least two connecting points makes pre-assembly in segments of the bar boxes provided with the busbars possible and the segments can be transported therewith and assembled on each other/above each other later.

BRIEF DESCRIPTION OF THE DRAWINGS

Embodiments of the invention will be described in more detail hereinafter with reference to the drawings, in which.

DETAILED DESCRIPTION OF THE EXAMPLE EMBODIMENTS

Figure 1:
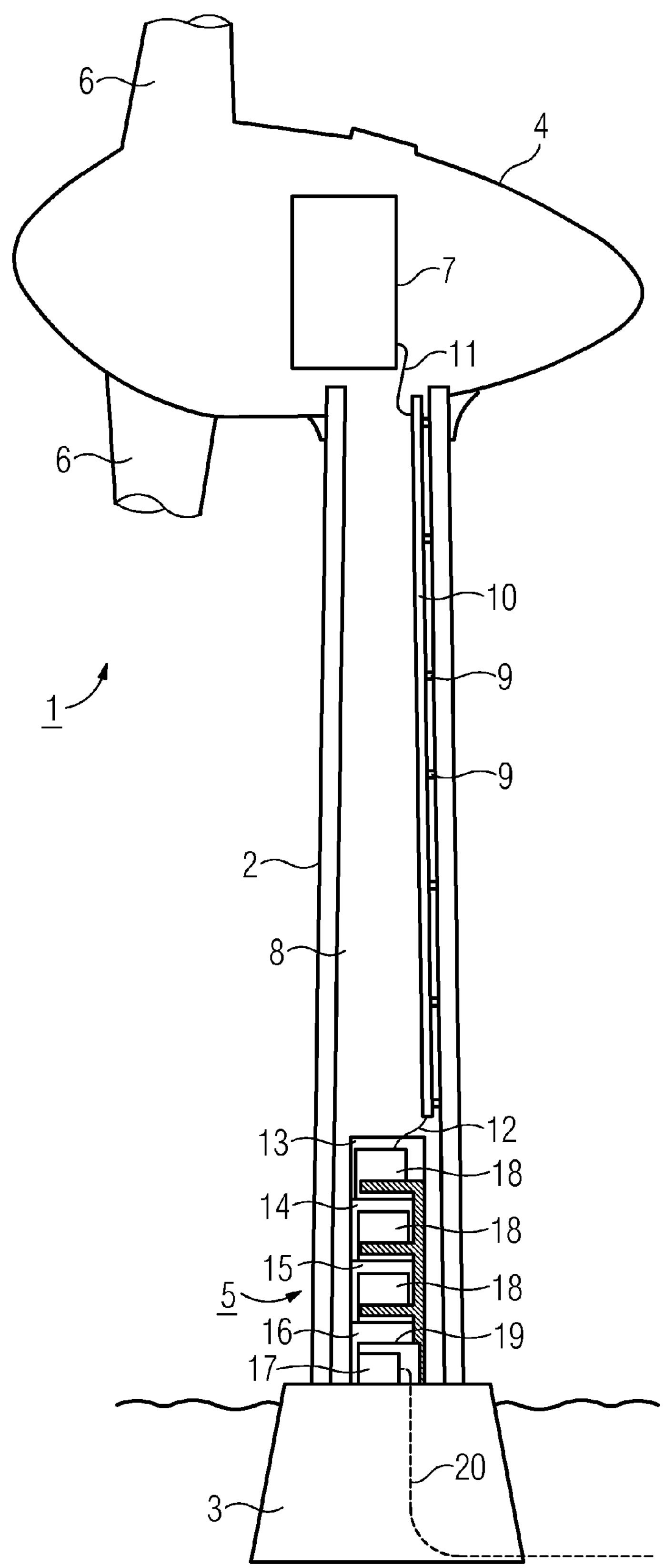
FIG. 1 shows a wind turbine comprising a power module.

The wind turbine schematically shown in FIG. 1 has a tower 2 with a base 3, a nacelle 4 rotatably mounted in the region of the top of the tower and a power module 5 arranged in the region of the bottom of the tower. A rotor rotatably mounted about a horizontal shaft and comprising a plurality of rotor blades 6 and an electrical generator 7 is arranged inside the nacelle 4. The wind forces acting on the rotor blades 6 cause the rotor to rotate and drive the generator 7 to generate electrical energy.

To transmit the energy generated by the generator 7 to the power module 5, which comprises various electrical units, busbars 10 attached in the interior 8 of the tower 2 to the wall with the aid of fastening elements 9 are provided which are connected in the region of butt joints of adjacent tower segments with the aid of flexible connecting bars. These busbars are electrically conductive and are electrically connected by a cable 11 to the generator and by a connecting line 12 to the power module 5.

The power module 5 is placed on a supporting plate of the base 3 and consists of four power module segments 13, 14, and 16 placed one above the other and which hold essential parts of the power module—i.e. for example a transformer 17, switch panels 18, a medium voltage electrical installation 19, etc. The output of the power module 5 (the transformer 17) is connected by a connecting line 20 to a power supply system (not shown).

Figure 2:
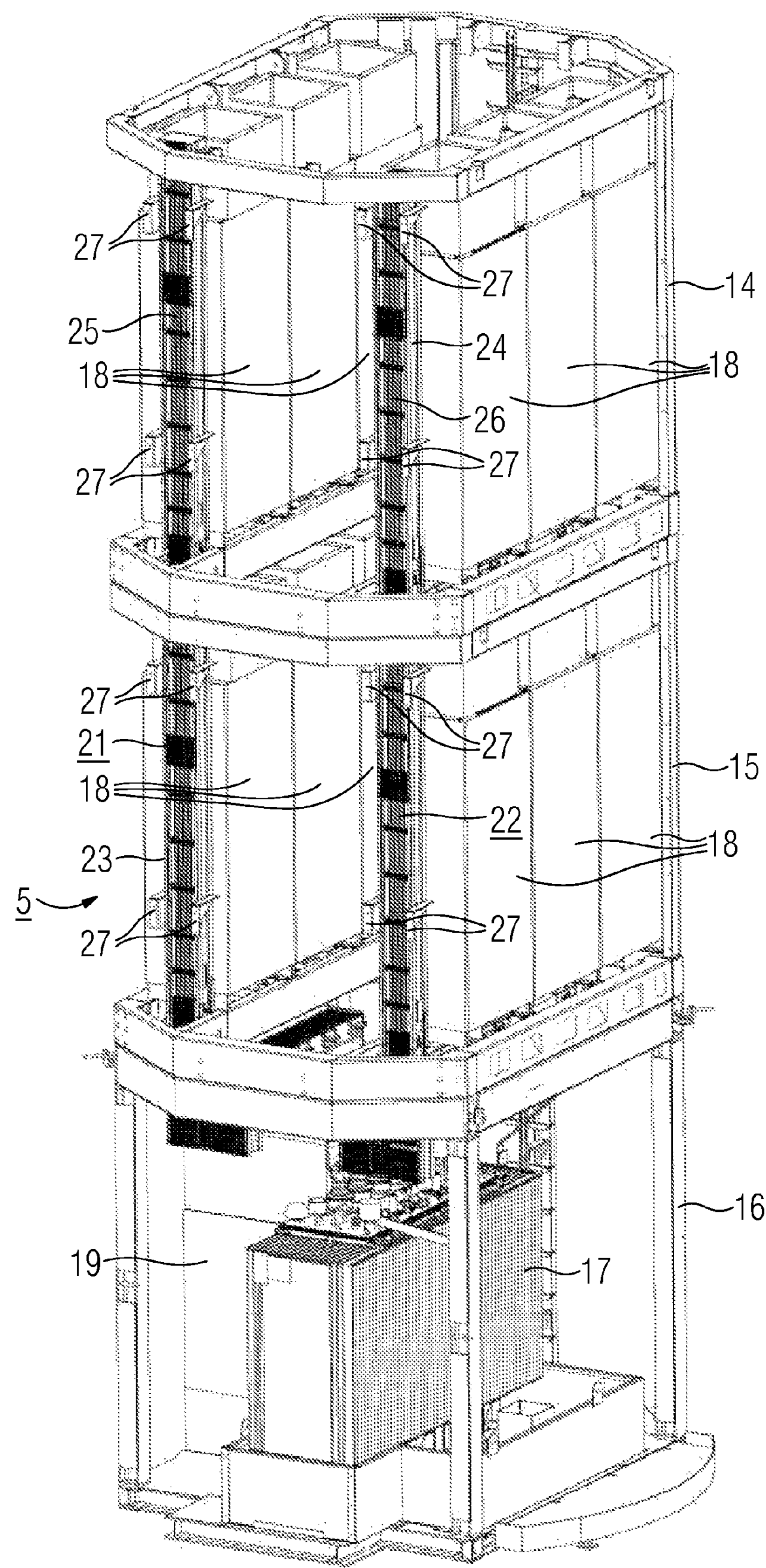
FIG. 2 shows three power module segments of the power module when assembled, comprising two busbar terminals which are arranged in busbar box terminals.
Figure 3:
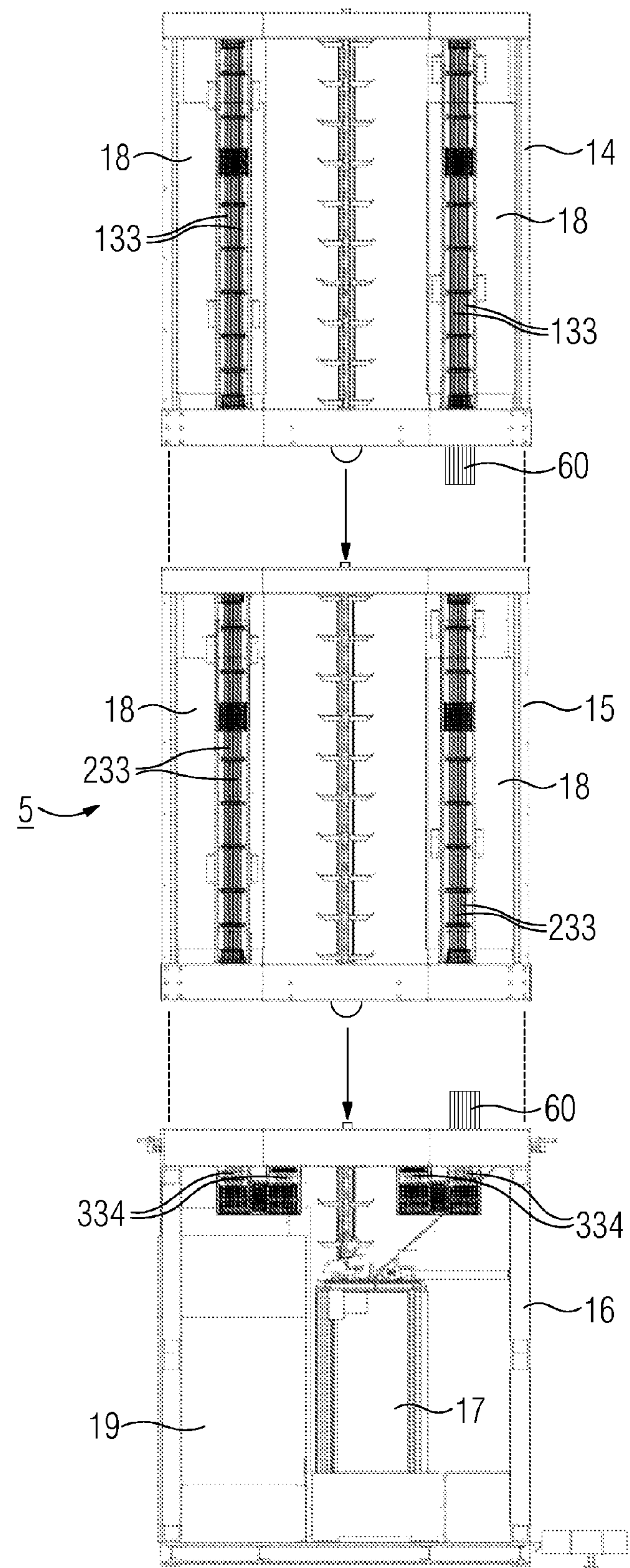
FIG. 3 shows the three power module segments in an exploded view with busbars pre-assembled in the power module segments and with devices for conductively connecting the busbars to the busbar terminals.

According to FIG. 2, which shows the three lower 14, 15, 16 power module segments of the power module 5, two line distributor terminals 21, 22 are provided in the power module 5 and each consists of a busbar terminal 25, 26 surrounded by a busbar box terminal 23, 24. Fastening elements 27 are provided on the busbar box terminals 23, 24. These are used for fastening the line distributor terminals 21, 22 to supporting elements (not designated further here) of the power module segments 14, 15, 16 (see also FIG. 4).

According to FIGS. 3 to 8 busbar boxes 40, 41, 42, 140, 141, 142, 240, 241, 242, 143, 243, 344 provided with busbars 30, 31, 32, 130, 131, 132, 230, 231, 232, 133, 233, 334 are pre-assembled in the power module segments 13 to 16, wherein neither the busbars nor the busbar boxes project beyond the outer dimensions of the power module segments 13, 14, 15, 16. The busbars are connected with the aid of three devices 50, 60, 60 for conductive connection of the busbars, wherein the connection is only made after the power module segments 13 to 16 have been joined together, so damage to the busbars and the busbar boxes surrounding them can be reliably prevented.

Figure 8:
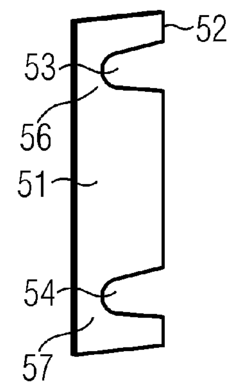
Figure 8:
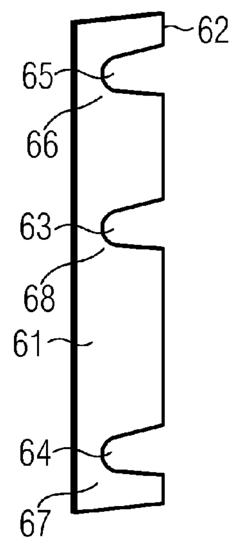
Figure 8:
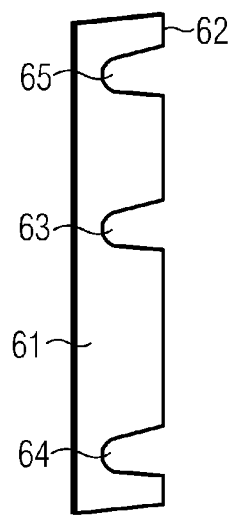
Figure 8:
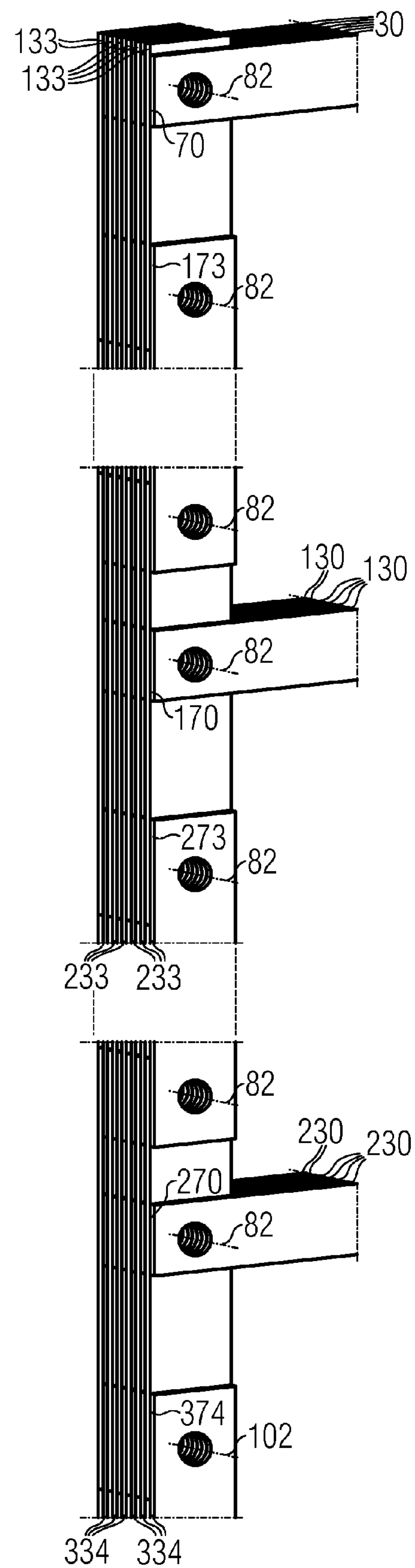

As may be gathered in particular from FIG. 8, contact sides 70, 173, 170, 273, 270, 374 of the busbars to be connected extend parallel to each other in a common contact plane. All devices 50; 60; 60 have rigid, planar connecting bars 51; 61; 61 for conductive connection of the busbars.

Figure 4:
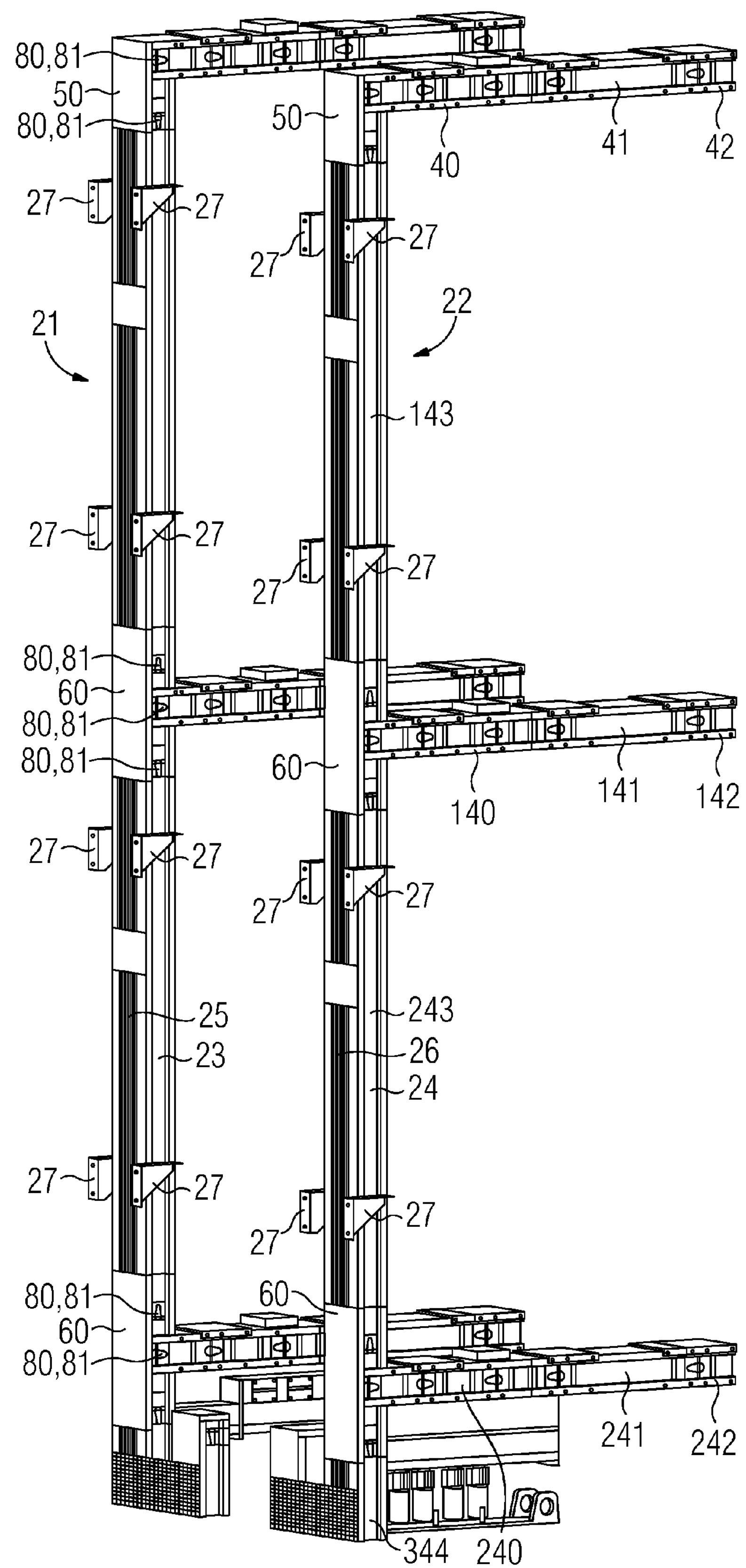
FIGS. 4 and 5 show two views of the busbar terminal of FIG. 2 arranged in the busbar box terminals.
Figure 5:
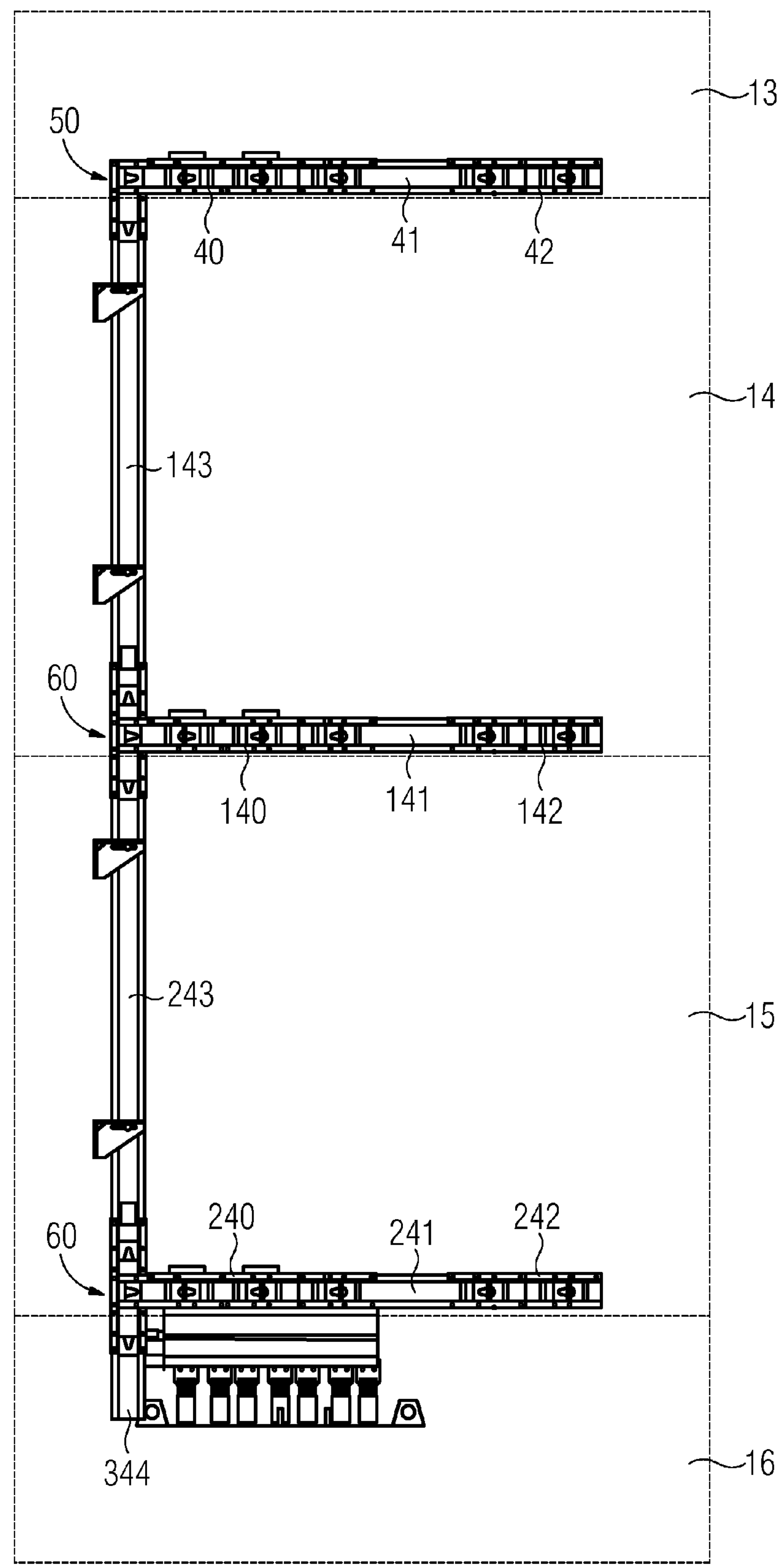
Figure 6:
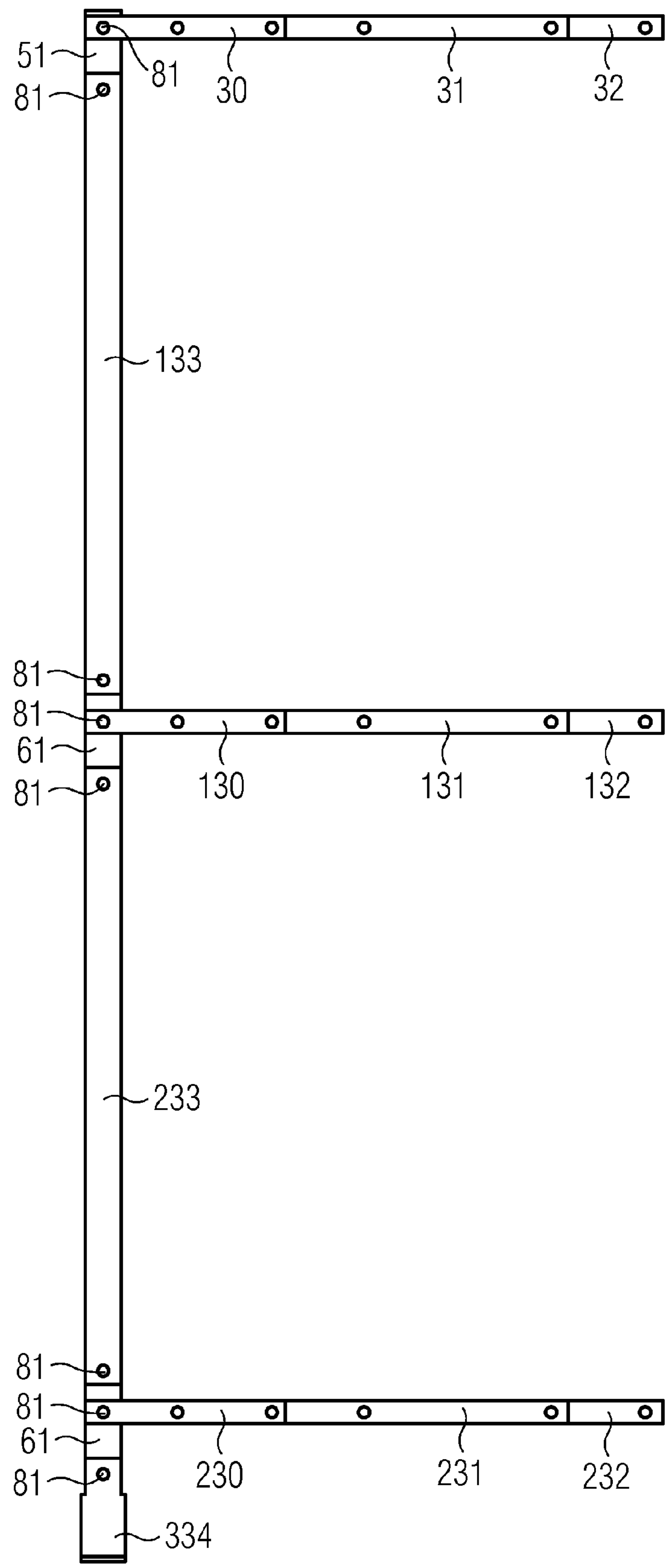
FIGS. 6 to 8 show one of the busbar terminals.

According to FIG. 4 the busbars to be connected are held together with one of the connecting bars associated with a connecting bolt 81 respectively by applying pressure with the aid of connecting mechanisms 80 which each have a connecting bolt 81 extending transverse to the contact sides. One contact surface 56; 66 respectively of the connecting bars 51; 61 conductively contacts a contact side 70; 173; 173, 170, 273; 273, 270, 374 of the busbars to be connected. The directions in which the individual connecting bolts extend through the busbars when pre-assembled are shown in FIG. 8 as broken lines 82.

According to FIG. 8 six of the busbars 30, 130, 230, 133, 233, 334 respectively form a busbar assembly.

Figure 7:
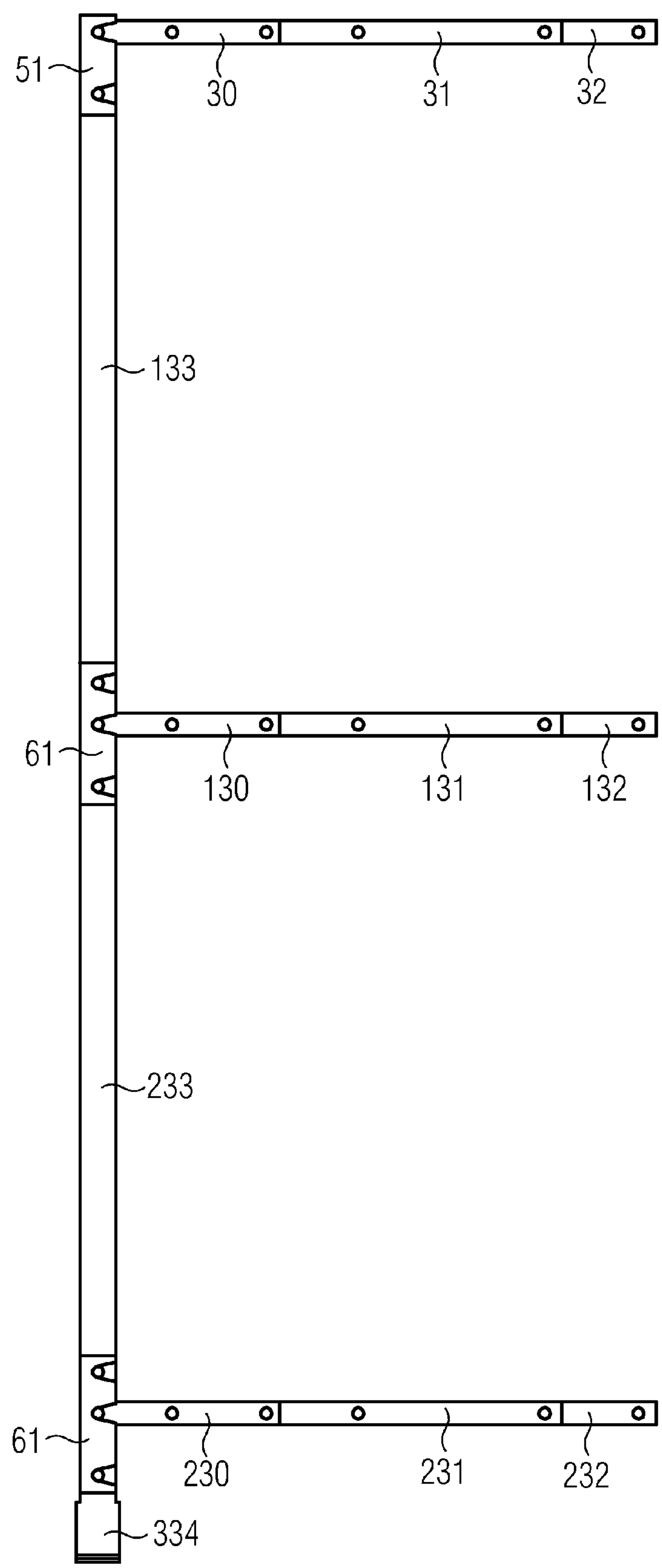

The connecting bars 51, which each connect one of the six busbars 30 respectively to one of the six busbars 133 to form an L-shaped busbar terminal section, firstly have a first 53 and a second 54 recess that is open on one side, on the side 52 facing the connecting bolts 81, such that the connecting bars embrace the connecting bolts 81. In FIG. 7 the leading busbars 30, 133, 130, 233, 230, 334 shown in FIG. 6 have been omitted to clarify this embodiment and to show the embracing of the connecting bolts 81.

Secondly, the connecting bars 61, which each connect one of the six busbars 133; 233 to one of the six busbars 130; 230 and to one of the six busbars 233; 334 to form a T-shaped busbar terminal section, have a first 63 and a second 64 and a third 65 recess that is open on one side, on the side 81 facing the connecting bolts 81, such that the connecting bars embrace the connecting bolts 81.

Figure 9:
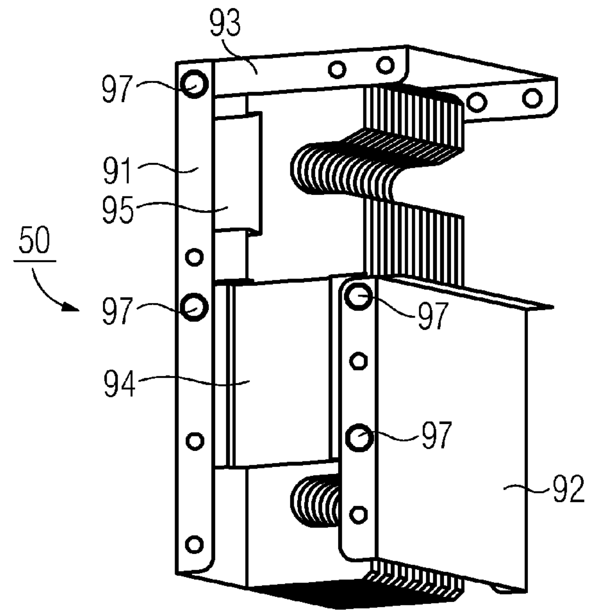
FIG. 9 shows a first one of the devices illustrated in FIG. 3 for conductively connecting the busbars.
Figure 10:
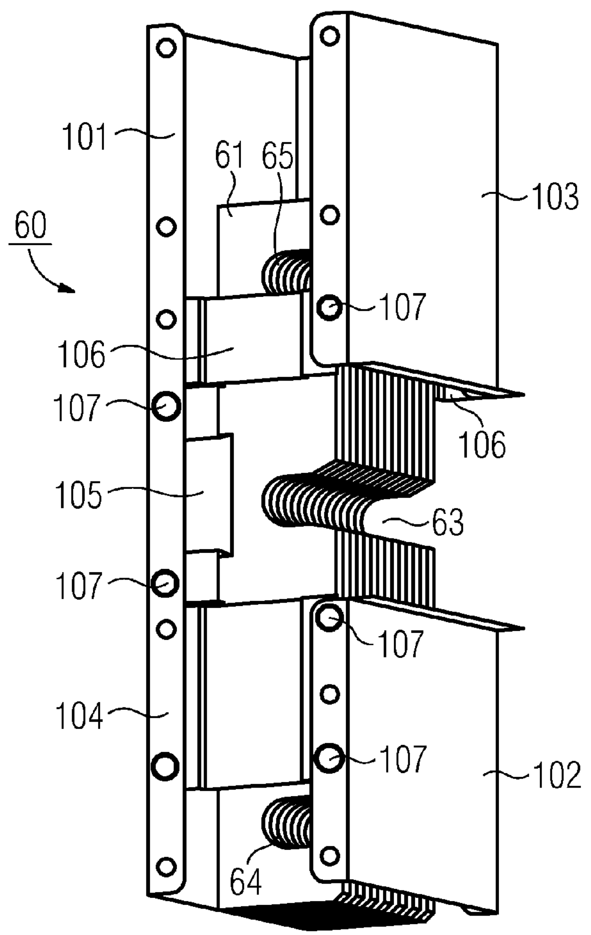
FIG. 10 shows a second one of the devices illustrated in FIG. 3 for conductively connecting the busbars and FIGS. 11 to 13 show a detail of the busbar terminal and of the busbar box terminal surrounding it during assembly.

According to FIGS. 9 and 10 the devices 50; 60 comprise wall elements 91 to 95; 101 to 106 which can be connected to the busbars 40, 143; 143, 140, 243; 243, 240, 344 to form the busbar box terminal, wherein the wall elements 91 to 95 of the first device 50 can be connected to the busbar boxes 40, 143 of the busbars 30, 133 to form an L-shaped busbar box terminal section and the wall elements 101 to 106 of the second device 60; 60 can be connected to the busbar boxes 143, 140, 243; 243, 240, 344 to form a T-shaped busbar box terminal section.

Figure 11:
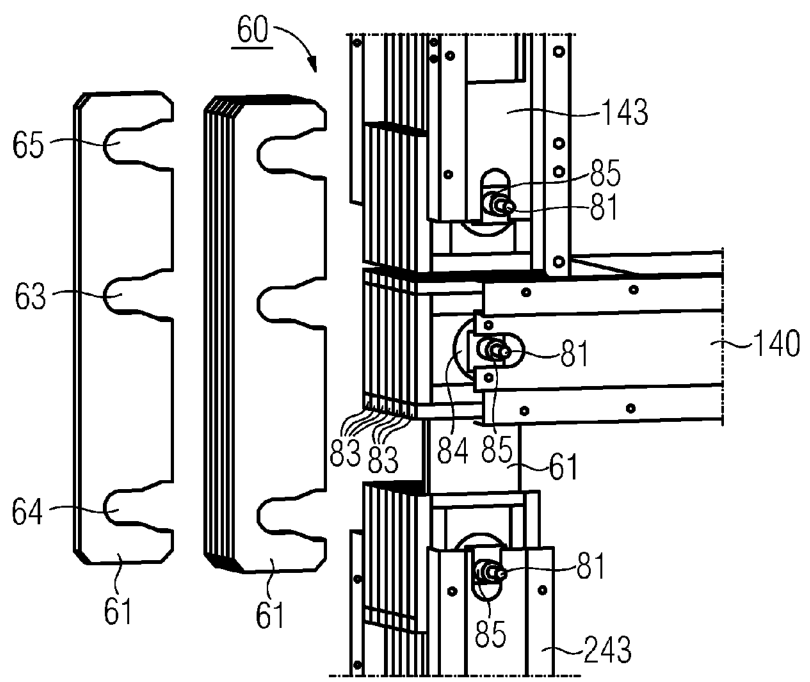

According to FIG. 11 the connecting mechanisms 80 are designed as single bolt clamps, as are known from document DE 42 25 837 C2. In addition to the connecting bolts 81 they therefore also comprise insulating bodies 83 which isolate the busbars with different phases from each other.

Figure 12:
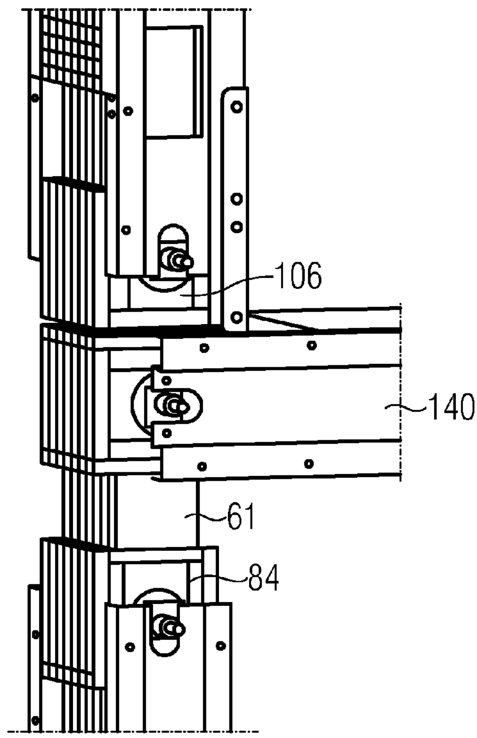
Figure 13:
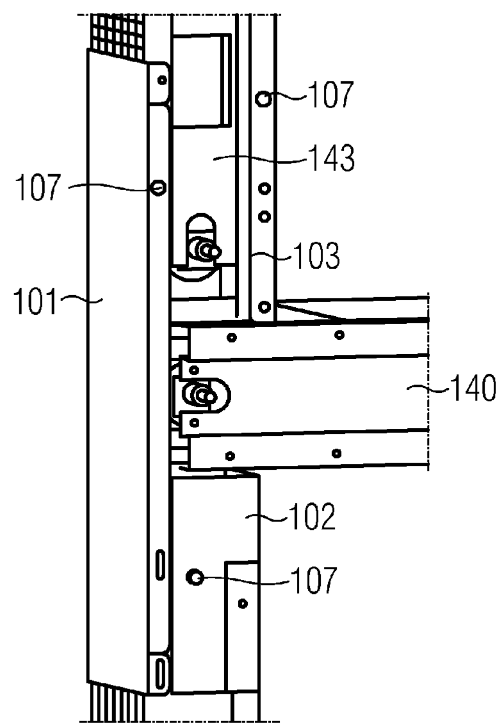

According to FIGS. 11 to 13 the busbars are connected in the following steps:

Firstly the connecting bars are pushed between one of the busbars 133, 130, 233 and one of the insulating bodies 83 respectively. The assembly comprising busbars 133, 130, 233, insulating bodies 83, connecting bars 61 and pressure elements 84 is then pushed together with the aid of a clamping nut 85 arranged at one end of the connecting bolt 81. The wall elements 101 to 106 of the device 60 are finally connected to the busbar boxes 143, 140 and 143 of the busbars preferably by screws 107.

For unequivocal positioning of the connecting bars the arrangements 50, 60 comprise one supporting element (not shown here) respectively made of insulating material, in particular plastics material, which is supported in a wall element 91; 101 that runs transverse to the direction in which the connecting bars are inserted.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A device comprising:

flat rectangular shaped rigid connecting bars for conductively connecting first busbars, that extend in a first direction, to second busbars, that extend in a direction orthogonal to the first direction, contact sides of the busbars running parallel to each other, the contact sides being holdable together with the connecting bars by applying pressure with the aid of a first and a second connecting mechanism, each of the first and second connecting mechanisms including a connecting bolt extending transverse to the contact sides, each of the connecting bars including a first contact surface to conductively contact the contact side of one of the first busbars and a second contact surface to conductively contact the contact side of one of the second busbars, wherein the connecting bars include a first and a second recess that is open on a long side of the rectangular shape, such that the connecting bars embrace the connecting bolts.

2. The device as claimed in claim 1, wherein for conductively connecting the first and second busbars to third busbars, the contact sides of which run parallel to the contact sides of the first and second busbars and which can be held together with the connecting bars by applying pressure with the aid of a third connecting mechanism, the third connecting mechanism including a connecting bolt extending transverse to the contact sides, each of the connecting bars including a third contact face to conductively contact the contact side of one of the third busbars and including a third recess that is open on the long side of the flat, rectangular shaped connecting bars that faces the connecting bolts, such that the connecting bars embrace the connecting bolts.

3. The device for conductive connection as claimed in claim 1, wherein the connecting bars are planar, so the first, second and third contact surfaces are located in a common contact plane.

4. The device for conductive connection as claimed in claim 1, further comprising:

wall elements to enclose the conductive connection and connectable to busbar boxes that enclose the busbars to form a busbar box terminal.

5. The device for conductive connection as claimed in claim 4, wherein the busbars are connectable with the aid of the connecting bars to form an L-shaped busbar terminal section and wherein the busbar boxes are connectable with the aid of the wall elements to form an L-shaped busbar box terminal section.

6. The device for conductive connection as claimed in claim 4, wherein the busbars are connectable with the aid of the connecting bars to form a T-shaped busbar terminal section and wherein the busbar boxes are connectable by way of the wall elements to form a T-shaped busbar box terminal section.

7. A wind turbine, comprising:

a power module, the power module forming an arrangement as claimed in claim 1.

8. A device as claimed in claim 1, wherein the connecting bars include a first and a second recess that is open on the side facing the connecting bolts.

9. The device for conductive connection as claimed in claim 2, wherein the connecting bars are planar, so the first, second and third contact surfaces are located in a common contact plane.

10. The device for conductive connection as claimed in claim 2, further comprising:

wall elements to enclose the conductive connection and connectable to busbar boxes that enclose the busbars to form a busbar box terminal.

11. The device for conductive connection as claimed in claim 10, wherein the busbars are connectable with the aid of the connecting bars to form an L-shaped busbar terminal section and wherein the busbar boxes are connectable with the aid of the wall elements to form an L-shaped busbar box terminal section.

12. The device for conductive connection as claimed in claim 10, wherein the busbars are connectable with the aid of the connecting bars to form a T-shaped busbar terminal section and wherein the busbar boxes are connectable by way of the wall elements to form a T-shaped busbar box terminal section.

13. The arrangement as claimed in claim 1, wherein the arrangement is in the form of a power module of a wind turbine and wherein the at least one first and one second segment includes a first a second power module segment of the wind turbine.

14. A wind turbine, comprising:

a power module, the power module forming an arrangement as claimed in claim 13.

15. The device as claimed in claim 1, wherein the openings on the long side of the connecting bars are configured to receive the connecting bolts therein.

16. The device as claimed in claim 1, wherein connect bars are interleaved between the busbars.

17. The device as claimed in claim 1, wherein at least one of the connecting bars has two contact sides, each of the two contact sides being in surface contact with contact sides of a first busbar and a second busbar.

* * * * *